Sept. 13, 1966   M. LANG   3,272,654
METHOD OF PRODUCING AN ELECTRODE FOR AN ELECTROCHEMICAL SYSTEM
Filed July 17, 1963
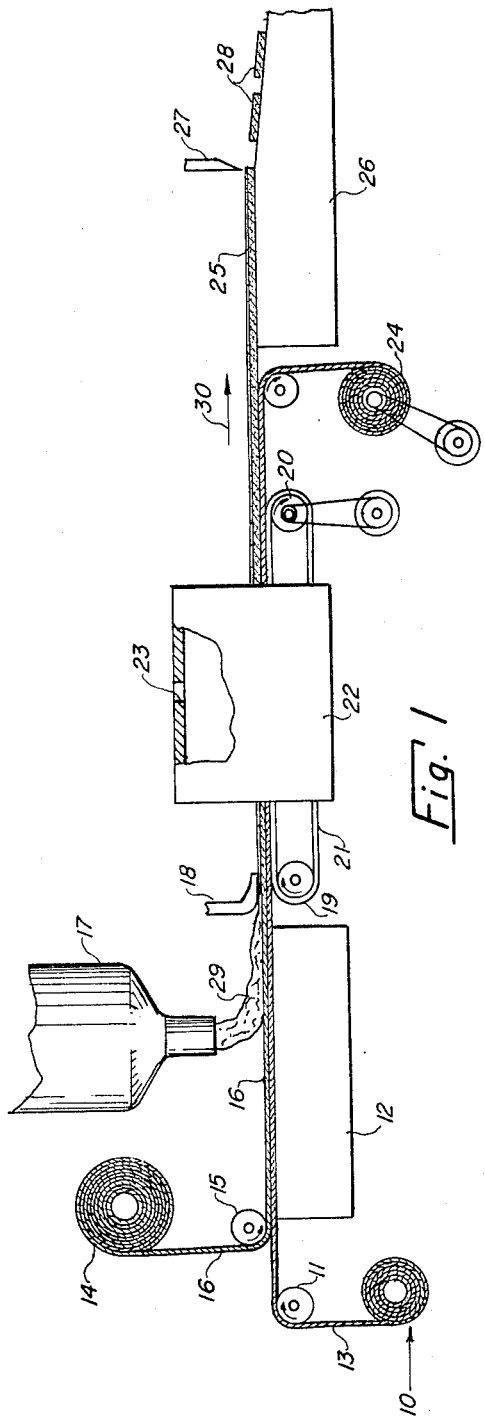
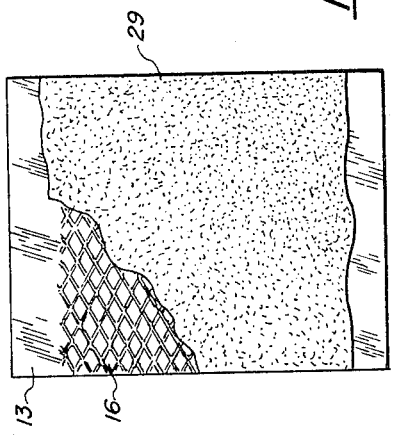
INVENTOR:
MAURICE LANG
BY
Karl J. Ross
AGENT.

United States Patent Office 3,272,654
Patented Sept. 13, 1966

3,272,654
METHOD OF PRODUCING AN ELECTRODE FOR AN ELECTROCHEMICAL SYSTEM
Maurice Lang, Massapequa, N.Y., assignor to Yardney International Corporation, New York, N.Y.
Filed July 17, 1963, Ser. No. 295,674
11 Claims. (Cl. 136—67)

My present invention relates to a method of producing an electrode for an electrochemical system and, more particularly, to the preparation of electrodes for alkaline primary and secondary or storage cells with particular emphasis upon the production of silver/silver oxide electrodes suitable for use in alkaline batteries.

It is known to produce battery electrodes by the pasted-plate system whereby a particulate material is admixed with a liquid to produce a paste or slurry which is then disposed on a support grid of a conductive metal. In general, earlier systems for pasting up plates of this type involved disposing the support grid upon a sheet of absorbent material (e.g. paper) and then applying the paste to the interstices of the grid. Since the layer upon which the plate was pasted was absorbent, it tended to absorb liquid from the paste and alter its viscosity and coherency. Moreover, it was noted that there was a greater tendency for the paste to adhere to the paper than to the generally smooth metal of the support grid. Consequently, stripping of the paper from the plate prior to its introduction into a sintering furnace, within which the paste is subjected to an elevated temperature sufficient to bond the particles of electrochemically active material to each other and to the metal grid, frequently resulted in removal of the material from the grid and produced discontinuities in the resulting plate. In fact, these difficulties prevented the production of relatively thin electrode plates (i.e. those having a thickness between substantially 0.004 and 0.009 inch) or relatively long plates (e.g. having a length on the order of 25 inches). When the paste is permitted to remain in contact with the absorbent layer, it tends to dry rapidly, with the active material crumbling to a loose powder, thereby preventing subsequent handling such as the sintering step previously mentioned. The aforementioned difficulties were not, however, eliminated by omission of the absorbent layer and its replacement by a nonabsorbent layer since, when the plate was pasted up upon a table having a nonabsorbent surface, the removal of the plate with the electrochemically active material only loosely adherent thereto also resulted in the formation of discontinuities at locations at which the electrochemically active material preferentially adhered to the nonabsorbent layer.

It is, therefore, an object of the present invention to provide an improved method of producing electrode plates for electrochemical systems wherein the aforementioned disadvantages are substantially eliminated.

Another object of the invention is to provide an improved method of pasting electrode plates and, more particularly, electrode plates produced from thermally decomposable materials such as metal oxides.

Another object of this invention is to provide a method of producing an electrode for an alkaline cell free from the inconveniences resulting from earlier systems as mentioned above.

These and other objects of the present invention are attained, in accordance with the present method, by initially disposing a generally planar support grid having interstitial openings upon a flat sheet of a refractory material incapable of absorbing liquid admixed with a particulate material to form a paste and which is nonbonding to this material at the elevated temperatures necessary to drive off the liquid and decompose the mass, the paste being deposited within the interstices in the grid upon this sheet to produce an electrode plate which is then carried on the flat sheet to a sintering furnace; the plate is exposed therein to an elevated temperature sufficient to drive off at least a major part of the liquid with decomposition of the particulate material without, however, causing bonding of this material to the nonabsorbent sheet, in spite of the fact that the resulting metal particles form a coherent body. Thereafter, the plate is removed from the sheet for treatment in the usual manner. It will be clear that the essence of the present invention resides in the use of a flat sheet of a relatively refractory material both as a pasting surface and as a support for the plate as it is exposed to the elevated temperatures. The liquid vehicle cannot, on the one hand, be absorbed from the paste to alter the viscosity of the latter nor, on the other hand, is it necessary to separate the plate, comprising a paste of loosely coherent particulate material, from the surface upon which the plate was pasted originally; the discontinuities resulting from earlier systems thus cannot arise from the present method.

According to a more particular feature of the present invention, the particulate material is a thermally decomposable metal oxide while the liquid admixed therewith is water. Advantageously, the flat sheet of refractory material can be a metallic foil which is thermally conductive to ensure uniform heating of both surfaces of the electrode plate. While substantially any metallic foil can be used, it is preferred to employ a foil of a metal which does not react readily with the metal oxide mass and which may have an inherent oxide coating adapted to prevent adhesion between the metal oxide and the foil while having refractory properties. Consequently, it is a more specific feature of the present invention to employ an aluminum foil as the planar support upon which the grid is disposed. This grid can be a conventional expanded metal composed of copper, silver or another metal compatible with the metal oxide.

As previously mentioned, the present technique is particularly suitable for use with metal oxides adapted to be converted, at elevated temperatures, into coherent masses having large surface areas of metals suitable in alkaline electrochemical systems and, especially, silver oxide, to produce the positive electrode of a storage cell. I have discovered that, with the present technique, it is possible to produce relatively thin electrodes having a thickness between substantially 0.004 and 0.009 inch; the latter is perhaps the lower limit of the thickness of pasted plate adapted to be produced by earlier techniques. For best results, the aluminum foil should have a thickness between substantially 0.002 and 0.005 inch. With the present method, it is possible to sinter the metal particles and to form them upon decomposition of the metal oxide, thereby bonding them to the support grid at an elevated temperature between substantially 900° and 1200° for a period on the order of 2 minutes, i.e. sufficient to drive off the major part of the water from the plate while decomposing the silver oxide and bonding the resulting silver particles to the grid to form a coherent mass having a large effective surface area within the interstices of this grid without effecting bonding of the active mass to the foil.

The above and other objects, features and advantages of the present invention will become more readily apparent from the following description, reference being made to the appended drawing in which:

FIG. 1 is a diagrammatic elevational view, partly in longitudinal cross-section, illustrating an apparatus for continuously carrying out the process of the present invention; and FIG. 2 is a plan view of an electrode plate, prepared in accordance with the present invention, prior to sintering.

In FIG. 1, I show a supply roll 10 of an aluminum foil having a thickness between substantially 0.002 and 0.005 inch. This foil 13 passes over a deflecting roller 11 onto the surface of a pasting table 12 upon which a continuous conductive grid 16 is deposited by a deflecting roller 15 from the supply roll 14. A hopper 17, which can be provided with a metering device at its mouth, deposits a particulate material 29 in paste form upon the support grid 16. A doctor blade 18, reciprocable transverse to the direction of travel of foil 13 (arrow 30), ensures that the deposit of electrochemically active material is level with the highest regions of the grid and fully fills the interstices of the latter. From the pasting table 12, the foil 13 carrying the support grid 16 filled with the paste passes onto a conveyor belt 21 supported between a pair of rollers 19, 20 and extending into the interior of the sintering furnace 22, shown only diagrammatically. This sintering furnace can have an inlet for a protective gas (nitrogen) as shown at 23 and may be of any conventional type. Within the furnace 22, the metal oxide is decomposed and the resulting metal particles are sintered together and to the metallic grid 16. Since the finished plate is coherent, the carrying foil 13 can be taken up upon a roll 24 for reuse, if desired, whence the finished plate 25 passes onto a cutting table 26 at which a blade 27 is vertically reciprocable to sever lengths 28 of electrode plate from the continuous strip. In FIG. 2, the foil 13, the grid 16 and the electrochemically active mass 29 are shown in greater detail.

EXAMPLE

In an apparatus of the type shown in FIG. 1 or by manual pasting and sintering methods, a positive electrode plate for a storage cell is produced. Two parts silver oxide with one part water (parts by weight) are admixed to produce a paste which is then doctored into the interstices of an expanded-metal grid composed of silver and having a thickness of about 0.006 inch. This pasting is done upon an aluminum foil having a thickness of about 0.003 inch, the aluminum foil being then used to carry the pasted plate into the sintering furnace within which it is exposed to a temperature between 900° and 1200° F. for two minutes. The silver oxide decomposes therein to metallic silver, the particles of which are sintered into coherent masses of active metal disposed within the interstices of the grid and fused thereto. The plates have a high effective surface area similar to that of conventional plates but have exceptionally uniform surfaces and cross-sections. Experimentation indicated that aluminum foils of thicknesses between 0.002 and 0.005 inch operate most effectively and that plates having a thickness between substantially 0.004 and 0.009 inch can be made efficiently by this method.

The invention described and illustrated is believed to admit of many modifications within the ability of persons skilled in the art, all such modifications being considered within the spirit and scope of the appended claims.

I claim:
1. A method of producing an electrode for an electrochemical system, comprising the steps of:
 admixing a particulate substance thermally decomposable into an electrochemically active material with a liquid to produce a paste;
 disposing a generally planar support grid upon a flat sheet of a refractory material incapable of absorbing said liquid from said paste and nonbonding to said active material at elevated temperatures;
 depositing said paste within the interstices of said grid upon said sheet to produce a plate;
 exposing said plate on said sheet to an elevated temperature sufficient to drive off at least a major part of said liquid and decompose said substance and sufficient to fuse said substance to said grid while forming a coherent mass of said substance within the interstices thereof;
 and thereafter removing said plate from said sheet.
2. The method of claim 1 wherein said substance is a metal oxide.
3. The method of claim 1 wherein said refractory material is thermally conductive.
4. The method of claim 2 wherein said liquid is water.
5. The method of claim 3 wherein said substance is a metal oxide.
6. The method of claim 3 wherein said refractory material is a metallic foil.
7. The method of claim 5 wherein said liquid is water.
8. The method of claim 6 wherein said particulate substance is a metal oxide.
9. The method of claim 8 wherein said liquid is water.
10. The method of claim 9 wherein said oxide is silver oxide.
11. The method of claim 10 wherein said foil is aluminum foil.

References Cited by the Examiner

UNITED STATES PATENTS

| | | | |
|---|---|---|---|
| 2,727,083 | 12/1955 | Hollman et al. | 136—31 X |
| 2,818,462 | 12/1957 | Solomon | 136—21 |
| 2,820,077 | 11/1958 | Salauze | 136—31 X |
| 2,906,803 | 9/1959 | Brown | 136—21 X |
| 3,108,910 | 10/1963 | Herold | 136—75 X |

WINSTON A. DOUGLAS, *Primary Examiner.*

B. J. OHLENDORF, *Examiner.*